Nov. 12, 1929.  F. W. PEARCE  1,735,177
AUTOMOBILE VISOR
Filed March 8, 1928  2 Sheets-Sheet 1
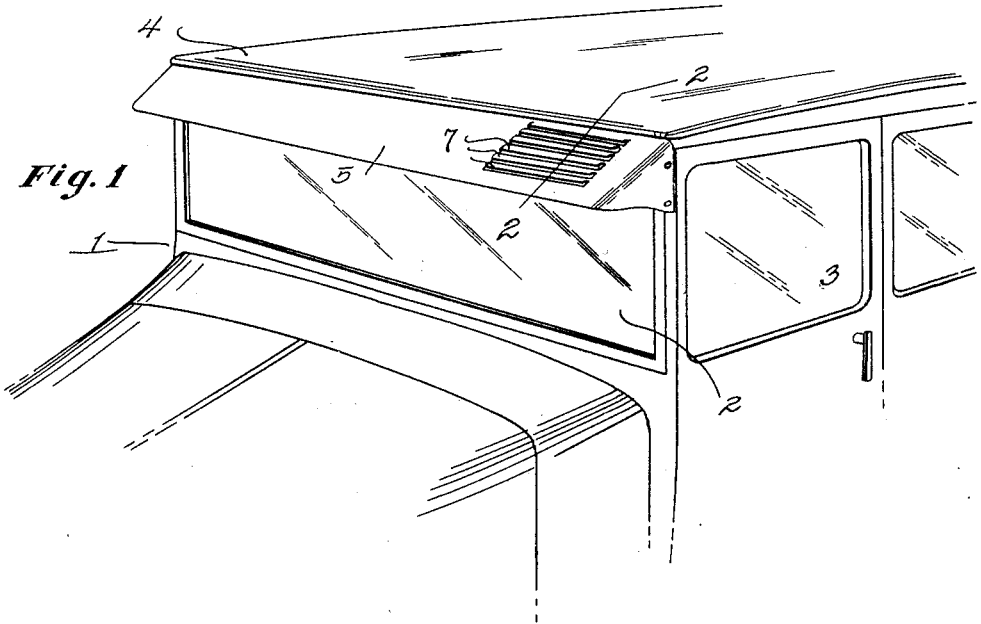
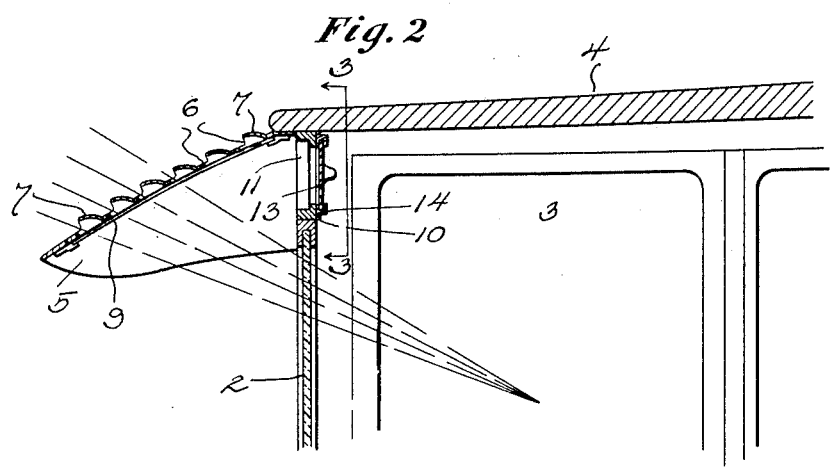
Inventor
Frank W. Pearce
By W. S. McDowell.
Attorney Nov. 12, 1929.         F. W. PEARCE         1,735,177
                       AUTOMOBILE VISOR
            Filed March 8, 1928        2 Sheets-Sheet 2
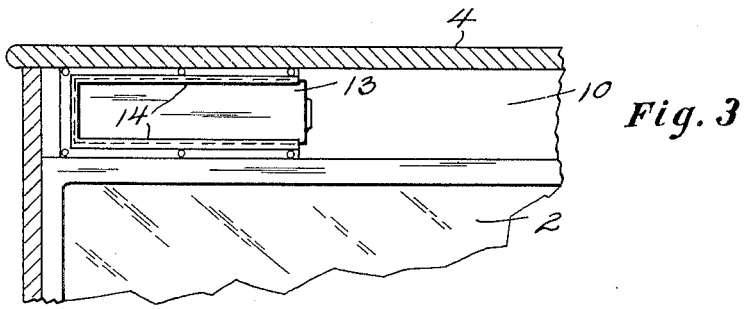
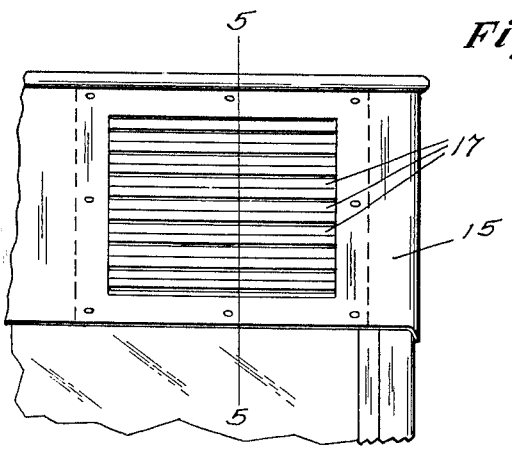
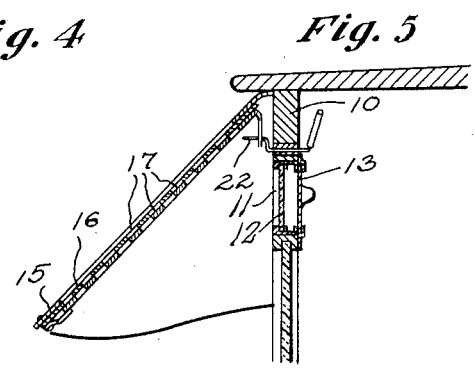
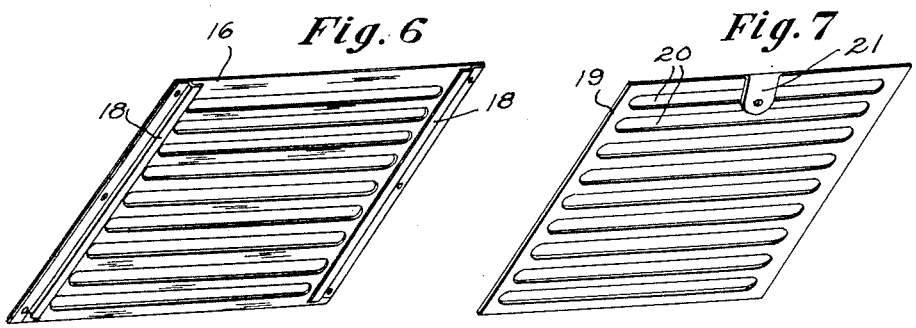
Inventor
Frank W. Pearce
By W. S. McDowell
Attorney Patented Nov. 12, 1929

1,735,177

UNITED STATES PATENT OFFICE

FRANK W. PEARCE, OF COLUMBUS, OHIO

AUTOMOBILE VISOR

Application filed March 8, 1928. Serial No. 260,172.

This invention relates to improvements in visors for motor vehicles, and has for its primary object the provision of a visor of the type employed for protecting the eyes of a vehicle driver from light, sun glare and the like, with means whereby the vehicle operator may see through the visor for the purpose of observing more completely and conveniently relatively overhead conditions.

In recent years motor vehicle traffic is regulated largely by automatic signal lamps, which are arranged at street intersections and produce differently colored lights for guidance of motorists. Ordinarily these signal lights occupy elevated positions and in many instances these lights are situated exactly in the center of a given street intersection in a suitable suspended or supported position above the intersection. Again, the lights may be located adjacent to the street curbing. In any event it is an inconvenient matter for a vehicle operator to observe the lights and signals carefully when approaching the light or lamp closely.

I have therefore provided in the upper part of the motor vehicle body, which may be said to include the visor, improved means for permitting of observation through said body from the vehicle driver's position for the purpose of facilitating the reading or observance of motor traffic direction signals.

With these and other objects in view, which will appear as the description proceeds, the invention consists in the novel features of construction, combination of elements, and arrangements of parts hereinafter fully described and set forth in the following claims.

In the accompanying drawings:

Figure 1 is a perspective view of a motor vehicle provided with a visor formed in accordance with the present invention, Figure 2 is a vertical transverse sectional view taken on the plane indicated by the line 2—2 of Figure 1, Figure 3 is a vertical sectional view on a plane indicated by the line 3—3 of Figure 2, Figure 4 is a front view showing a slightly modified form of visor, Figure 5 is a vertical sectional view taken on the plane indicated by the line 5—5 of Figure 4, Figure 6 is a detailed perspective view showing a position of the visor disclosed in Figure 4, and Figure 7 is a view of the sliding shutter.

Referring more particularly to the drawings the numeral 1 designates the body of a motor vehicle, the latter being formed to include the usual windshield 2, doors and windows 3, and a top 4. Arranged to extend longitudinally over the windshield and to project above the upper edges thereof is a sun visor 5, which may be formed from any suitable material and permanently or detachably connected with the body as may be desired.

In this instance the visor as shown in Figures 1 and 2 has been shown as constructed from sheet metal and in this instance the visor, in front of the vehicle driver's position, is provided with a plurality of longitudinally extending vision slots 6, which are covered partially by fixed louvers 7. These louvers are so disposed in relation to the slot 6 that the vehicle driver may see through the same, as indicated by the broken lines in Figure 2. When not in use the slot 6 may be closed by means of a sliding plate or shutter 9, slidably carried by the underside of the visor.

In vehicles of a certain design I found it advisable, if not necessary, to provide the frame 10 of the vehicle body, immediately over the windshield 2, with a sight aperture 11. Ordinarily the aperture is closed by means of a panel 12, and the aperture may be completely closed, if desired, by the use of an opaque panel or shutter 13, which is slidably mounted by guides 14 arranged on the inner wall of the frame 10.

When the shutter 13 is open and likewise the shutter 9 a clearer vision through the upper portion of the vehicle body, including the visor, is obtainable to permit the operator or driver to view overhead traffic signals under other conditions.

In Figures 4 to 7, inclusive, a visor 15 is provided with an oblong recess or cut-away portion in which is permanently and rigidly positioned a plate 16 is mounted. This plate is provided with longitudinally extending parallel vision slots 17, and on the counter-side of the plate there are mounted spaced guide strips 18, slidably situated within the strips 18 is a shutter 19. This shutter is formed with slots 20 adapted to slip into and out of ridges with the slot 17 for the purpose of opening and closing the vision apertures.

To regulate the opening and closing positions of the shutter 19, the latter is provided with a lug or ear 21, which is pierced for the reception of a rotatable crank 22 which is carried by the frame 10. By rotating the crank from the inside of the vehicle body the shutter may be reciprocated to open or close the visor aperture. In the form of the invention disclosed in Figure 5 the frame 10 is provided with a panel 12 and co-operating with the parts as disclosed in Figures 2 and 3.

In view of the foregoing it will be seen that the present invention provides a visor or vehicle body with means permitting of the observance of overhead vehicle signals and the like from the operator's position. This is accomplished conveniently on the part of the operator without causing the latter to assume awkward or uncomfortable positions and in addition the construction makes for safety in the operation of motor vehicles by permitting the drivers to more fully observe the traffic signals. While I have described what I consider to be the preferred forms of my invention, it nevertheless is to be understood that I do not limit myself to the precise detail of construction and arrangement specifically illustrated and described, but reserve the right to employ all such modifications and variations of the invention that may be said to fall fairly within the scope of the following claims.

What is claimed is:

1. In a motor vehicle, a windshield, a frame structure disposed above said windshield and provided with a vision opening, a sun visor arranged to the front of said structure and said windshield, said visor being provided with an opening disposed in registration with the opening in said frame structure and a shutter slidably carried on the under side of said visor for opening and closing the opening in said visor.

2. In a motor vehicle, a windshield, a frame structure disposed above said windshield, a sun visor arranged to the front of said frame structure and provided with a vision opening, a transparent panel arranged to occupy an orifice in said frame structure, said orifice being disposed in registration with the vision opening in said visor, a shutter carried on the under side of said visor for opening and closing said vision opening and means carried by said frame structure operable from the interior of the vehicle and operating the said shutter.

In testimony whereof I affix my signature.

FRANK W. PEARCE.